June 11, 1957  E. S. CONRAD  2,795,664
TEST ADAPTER FOR MEASURING CURRENT AND VOLTAGE IN
ELECTRON TUBES AND ELECTRIC CABLE CONNECTORS
Filed Aug. 21, 1953  2 Sheets-Sheet 1

INVENTOR.
EDWIN S. CONRAD
BY
McMorrow, Berman + Davidson
ATTORNEYS

INVENTOR.
EDWIN S. CONRAD
BY
McMorrow, Berman + Davidson
ATTORNEYS

2,795,664

TEST ADAPTER FOR MEASURING CURRENT AND VOLTAGE IN ELECTRON TUBES AND ELECTRIC CABLE CONNECTORS

Edwin S. Conrad, Collingdale, Pa.

Application August 21, 1953, Serial No. 375,688

4 Claims. (Cl. 200—51.1)

This invention relates to electrical test apparatus, and more particularly to test equipment for measuring current and voltage in electron tubes and in cable connectors without disconnecting the circuits involved.

The main object of the invention is to provide a novel and improved test apparatus for measuring current or voltage in electron tubes while functioning, or in electrical cable connectors without requiring the associated circuits to be disconnected, the improved test apparatus being simple in construction, being easy to use, and involving relatively few parts.

A further object of the invention is to provide an improved test apparatus for measuring current flowing through various circuits in an electron tube or in conjunction with a cable connector, the said test apparatus being inexpensive to manufacture, being durable in construction, and requiring no special tools for the use thereof.

A still further object of the invention is to provide an improved test adapter which may be rapidly inserted between an electron tube and its socket, or between a male and female set of cable connectors, the improved test adapter enabling any one of the circuits involved in the electron tube or in the multiple wire cable with which the adapter is employed to be tested for current flow or for other characteristics without requiring any of the associated wire connections to be unsoldered or disconnected, and without interfering with normal circuit conditions.

Further objects and advantages of the invention will become apparent from the following description and claims, and from the accompanying drawings, wherein:

Figure 1:
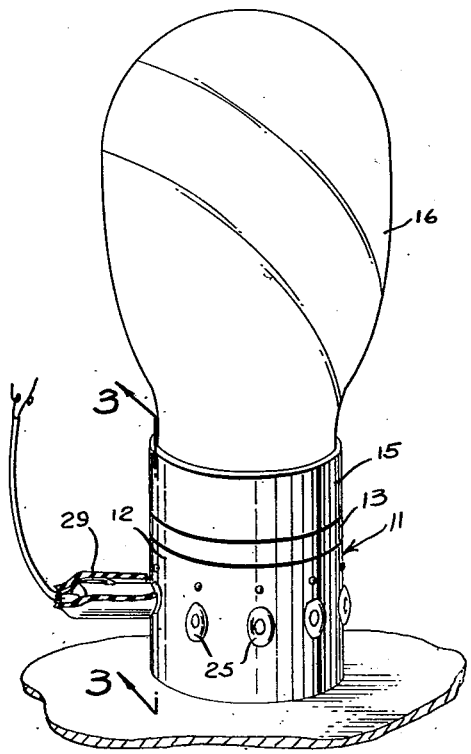
Figure 1 is a perspective view of an electron tube showing an improved test adapter and test plug associated therewith installed between the electron tube and its socket for measuring current through one of the electron tube circuits.

Referring to the drawings, and more particularly to Figures 1, 2 and 3, 11 designates a test adapter according to the present invention, said adapter comprising a generally cylindrical body 12 having a top wall 13 and a bottom wall 14. The adapter 11 may be designed for use in conjunction with the conventional octal socket employed in radio and electronic equipment for the reception of the octal base 15 of a conventional electron tube 16. Thus, the top wall 13 of the adapter is provided with prong-receiving recesses 17 having the contact elements 18 therein to make contact with the prongs 19 of the electron tube, and the top wall 13 likewise has the central keyed opening 20 to receive the key lug 21 of the tube base 15. The bottom wall 14 is provided with the prongs 22 depending therefrom and being identical with the prongs on the electron tube base 15, said bottom wall 14 being likewise formed with the keyed lug 23 identical to the keyed lug 21 of the tube base. Thus, the adapter may be inserted in the octal socket 24 of an electronic device in place of the electron tube 16, and the electron tube 16 may then be engaged in the top 13 of the adapter in the manner shown in Figure 1.

Secured in the side wall of the body 12 and arranged therearound are a plurality of metal eyelets 25 and secured to the side wall internally of the body 12 adjacent each eyelet 25 is a spring contact element 26 normally overlying and conductively engaging the eyelet. Each spring contact element 26 is connected by suitable conductor means 27 to one of the prong-engaging contacts 18, and each eyelet 25 is electrically connected by suitable conductor means 28 to the corresponding prong 22 of the adapter, as shown in Figure 3.

Thus, each prong-receiving element 18 is normally electrically connected to a corresponding prong 22, whereby the normal circuits of the electron tube 16 remain undisturbed when the electron tube is mounted in the adapter, with the adapter engaged in the socket 24.

Designated at 29 is a test plug comprising a metal sleeve member 30 in which is secured a sleeve 31 of suitable insulating material, such as fibre or the like, which contains the conductive metal shank element 32 and grippingly secures said shank element with its respective end portions projecting beyond the opposite ends of the metal sleeve 30. As shown in Figure 3, the end of the conductive shank 32 is adapted to engage a spring contact 26 when the sleeve 30 is engaged in one of the eyelets 25, whereby the spring contact 26 is moved out of its normal engagement with the eyelet and is instead electrically connected to the shank element 32, while the eyelet is at the same time electrically connected to the sleeve member 30.

Figure 3:
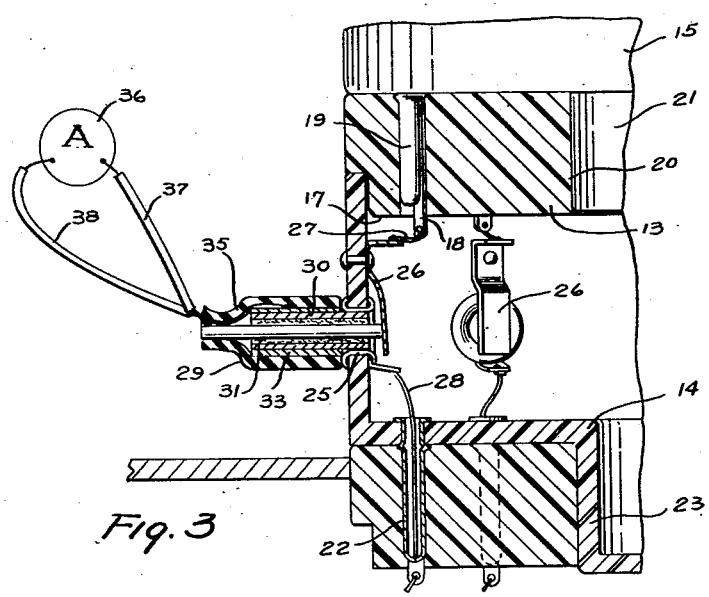
Figure 3 is an enlarged vertical cross sectional detail view taken on the line 3—3 of Figure 1.
Figure 5:
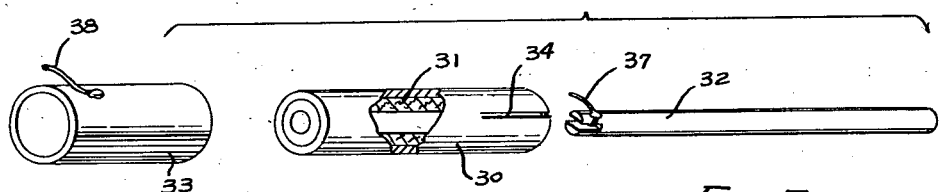
Figure 5 is a perspective view, partly in cross section, of the elements of the test plug illustrated in Figures 1, 2, 3 and 4, the components of the test plug being shown in separated positions.

Rigidly engaged around the sleeve member 30 is an outer metal sleeve 33, said outer sleeve 33 being substantially shorter than the sleeve 30, as shown in Figures 3 and 5. The sleeve 30 is formed with diametrically opposed, longitudinally extending slits 34 at the exposed end portion thereof located forwardly beyond the outer sleeve 33, whereby the semicylindrical segments thus defined at the end of the sleeve 30 may flex slightly relative to each other and may thus frictionally engage inside a selected eyelet 25.

The test plug 29 is provided with the outer sheath 35 of suitable insulating material, such as rubber or the like, the forward edge of the rubber sheath being substantially flush with the forward edge of the outer metal sleeve 33, and the rear portion of the sleeve substantially covering the rear end portion of the shank element 32, as is clearly shown in Figure 3.

Designated at 36 is a current indicating device, such as an ammeter, one terminal of the ammeter being connected by an insulated wire 37 to the end of the shank element 32, and the other terminal of the ammeter being connected by an insulated wire 38 to the outer metal sleeve 33.

In using the device, with the test adapter engaged in the tube socket 24 and with the electron tube engaged in the top wall of the test adapter, as above described, the current through any one of the tube circuits may be measured by inserting the test plug 29 in the associated eyelet 25, whereby the meter 36 is electrically connected in series with the selected tube circuit. While the current readings are being made, none of the other tube circuits are disturbed, since the associated spring contacts 26 remain in conductive, overlying engagement with the respective eyelets 25 of the test adapter.

Figure 2:
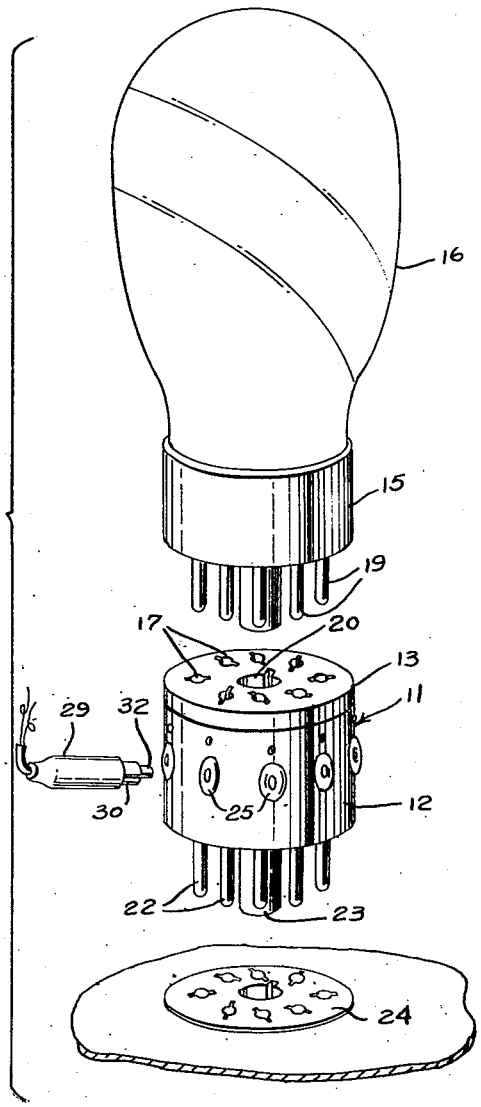
Figure 2 is a perspective view of the elements of Figure 1, shown in separated positions.
Figure 4:
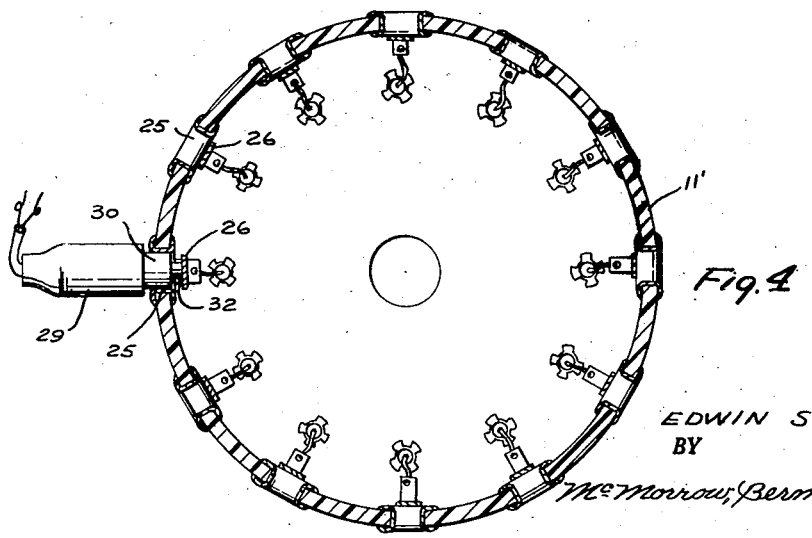
Figure 4 is an enlarged horizontal cross sectional view taken through an adapter and associated test plug designed for use in conjuntion with a twelve-wire cable connector and being otherwise similar in construction to the test adapter and test plug shown in Figures 1, 2 and 3.

Referring now to Figure 4, a test adapter 11' is shown in horizontal cross sectional view, the adapter being arranged for use between the male and female connector elements of a twelve-wire cable, the adapter being otherwise similar in construction to the adapter 11 of Figures 1, 2 and 3. As in the previously described form of the invention, the test plug 29 may be inserted in a selected eyelet 25 to connect the ammeter or other current measuring device in series with one of the cable circuits. At the same time, the remaining cable circuits are undisturbed, since the remaining spring contacts 26, other than that engaged by the end of the shank 32 of the test plug 29, remain in contact with their associated eyelets 25.

Obviously, test adapters may be provided in accordance with various types of tube base and tube socket constructions, and in accordance with various types of cable connectors employed for multiple wire cables.

While certain specific embodiments of an improved test apparatus for electrical cable circuits and for electron tube circuits have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A test adapter comprising a hollow cylindrical base having prongs adapted to be inserted into socket openings, respective vertical prong-receiving elements on said base adapted to receive the prongs of a vacuum tube, respective conductive annular eyelet elements mounted on the side wall of said base substantially in a common horizontal plane and adapted to receive a test plug, and respective spring elements mounted inside said base and normally overlying and conductively engaging the ends of the respective eyelet elements, the respective spring elements and the respective eyelet elements being electrically connected in circuit with the respective prongs and prong-receiving elements, the spring elements being engageable by and yieldable when engaged by the test plug so that a testing device connected to the plug may be at times selectively connected in series with the respective sets of prong-receiving elements and prongs.

2. In combination, a test adapter comprising a hollow cylindrical base having prongs adapted to be inserted into socket openings, respective vertical prong-receiving elements on said base adapted to receive the prongs of a vacuum tube, respective conductive annular eyelet elements mounted on the side wall of said base substantially in a common horizontal plane, a test plug engageable in the eyelet elements, said plug having a conductive sleeve element and a central conducting shank insulated from and projecting beyond said sleeve element, and respective spring elements mounted inside said base and normally overlying and conductively engaging the ends of the respective eyelet elements, the respective spring elements and the respective eyelet elements being electrically connected in circuit with the respective prongs and prong-receiving elements, the spring elements being engageable by and yieldable when engaged by the conductive shank of the test plug so that a testing device connected to the sleeve element and the shank of the plug may be at times selectively connected in series with the respective sets of prong-receiving elements and prongs.

3. In combination, a hollow body member having a bottom wall and a top wall, respective conductive prongs secured to and projecting from said bottom wall, respective vertical prong-receiving elements in said top wall adapted to receive the prongs of a vacuum tube, a plurality of annular conductive eyelet members secured in the side wall of said body substantially in a common horizontal plane, respective spring contacts secured inside said body and normally overlying and engaging the ends of the respective eyelet members, and means connecting the respective sets of eyelet members and spring contacts in series with respective sets of prongs and prong-receiving elements.

4. In combination, a hollow body member having a bottom wall and a top wall, respective conductive prongs secured to and projecting from said bottom wall, respective vertical prong-receiving elements in said top wall adapted to receive the prongs of a vacuum tube, a plurality of annular conductive eyelet members secured in the side wall of said body member substantially in a common horizontal plane, respective spring contacts secured inside said body member and normally overlying and engaging the ends of the respective eyelet members, means connecting the respective sets of eyelet members and spring contacts in series with respective sets of prongs and prong-receiving elements, and a plug adapted to be selectively inserted in the eyelet members, said plug having a conductive sleeve element conductively engageable in the eyelet members and a conductive shank arranged concentrically in and insulated from said sleeve element, said shank projecting axially a substantial distance beyond the end of the sleeve element and being conductively engageable with the spring contact associated with the eyelet member, whereby said spring contact is disengaged from the eyelet member and whereby a test device connected to the sleeve element and shank may be electrically connected in series with respective sets of prongs and prong-receiving elements.

References Cited in the file of this patent

UNITED STATES PATENTS

| 950,107 | Larsson | Feb. 22, 1910 |
| 1,303,464 | Davis | May 13, 1919 |
| 1,819,805 | Zuckerman | Aug. 18, 1931 |
| 1,928,345 | Wisman | Sept. 26, 1933 |
| 2,609,409 | Radeke | Sept. 2, 1952 |
| 2,664,475 | Harlin | Dec. 29, 1953 |

FOREIGN PATENTS

| 172,024 | Austria | July 25, 1952 |
| 691,333 | Germany | May 23, 1940 |